Dec. 24, 1935.　　　　J. BELTER　　　　2,025,083

HYDROPNEUMATIC POWER PLANT

Filed Feb. 15, 1932　　　4 Sheets-Sheet 4

INVENTOR.
James Belter.
BY
ATTORNEY.

Patented Dec. 24, 1935

2,025,083

UNITED STATES PATENT OFFICE 2,025,083

HYDROPNEUMATIC POWER PLANT

James Belter, St. Louis, Mo.

Application February 15, 1932, Serial No. 593,102

48 Claims. (Cl. 253—17)

My invention relates to a hydro-pneumatic operated power plant.

The object of the invention is to provide a simple and efficient power system by means of which power can be generated through hydro-pneumatically operated motors, using as a motive force, water delivered into a reservoir from a continuous source of supply which is discharged periodically in predetermined quantities from one of the motors into a body of water at a lower elevation than the water in the reservoir.

One of the objects of my invention is the provision of a power system in which one or more motors are employed which are hydro-pneumatically operated to drive a power shaft.

Another object of the invention is the provision of a system of connecting the units of a motor in one compartment of a reservoir filled with water with like units of a motor in another compartment of the reservoir.

A further object of the invention is the provision of a water motor rotor having a cylinder open at both ends and a pneumatic piston or float mounted for movement therein with the flow of water from the ends of the cylinder.

A still further object of the invention is the provision of a hydro-pneumatically operated power plant which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 5 is a vertical sectional view through one of the rotors and the fluid inlet end of the conduit associated therewith.

Briefly, the power plant embodying my invention, comprises a running source of water supply, such as a falls, a reservoir to be continuously supplied with water from said source of supply, a motor, or motors supported in the reservoir and submerged in the water thereof and each motor consisting of a plurality of hydro-pneumatic rotors, arranged in axial alignment side by side, and where a plurality of motors are employed, like rotors of the motors are series connected so that water discharged from the rotors of the master motor is utilized by like rotors of the other motors until discharged from the rotors of the last motor into a stream below the water level thereof, thus the water initially utilized by the rotors of the master motor to actuate the rotors thereof is used by the rotors of other motors until discharged to the open.

Figure 1:
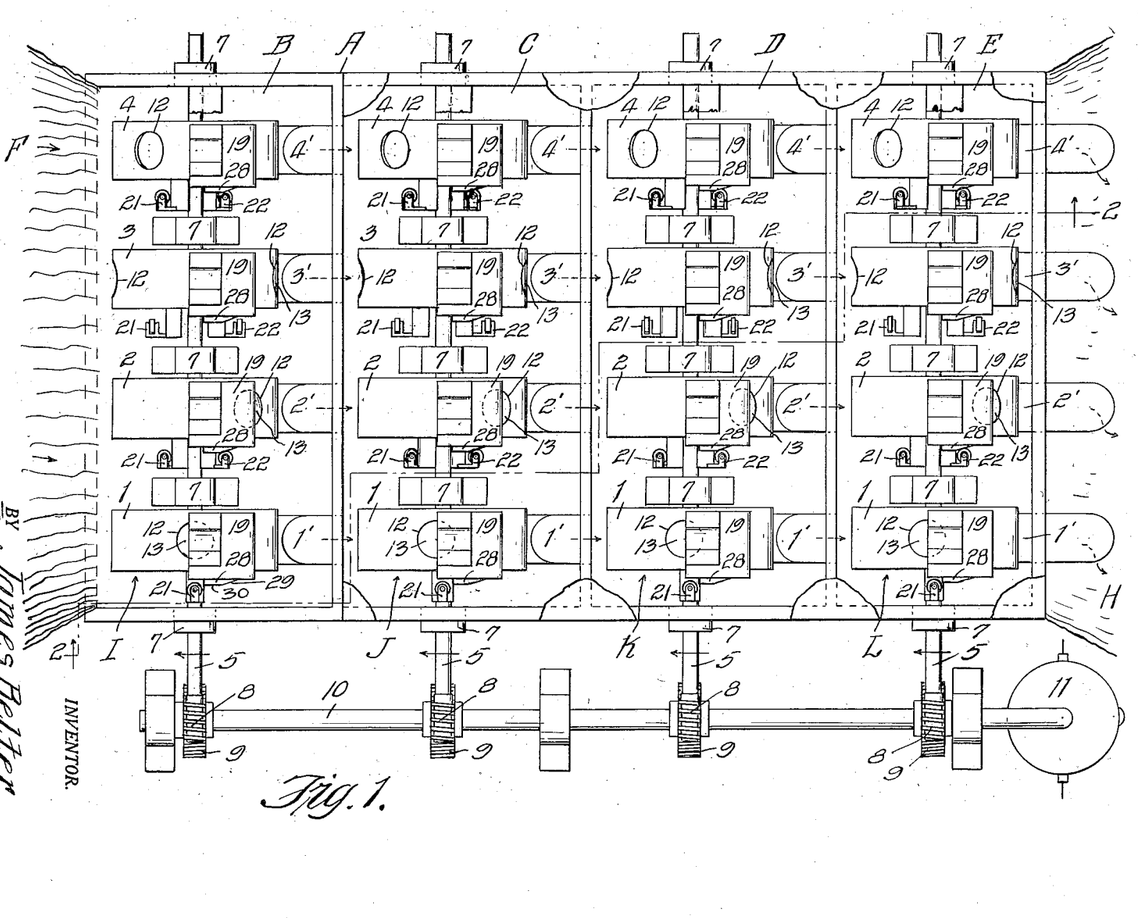
Fig. 1 is a top plan view of a hydro-pneumatically operated power plant embodying the features of my invention.

For the purpose of illustration only, I have shown in Fig. 1, the use of what I term four motors, each consisting of four hydro-pneumatic rotors arranged in axial alignment inter-connected with a power transmitting shaft. For the purpose of comparison only, the cylinders of the four rotors of each motor shown compare favorably to four crank throws of an engine shaft, due to the positions of phase relation of cylinders which are shown as disposed at angles of forty-five degrees to each other. In the case of six rotors being employed in each motor, their cylinders would be disposed at angles of thirty degrees to each other, and in the case of twelve rotors being used to each motor, the cylinders thereof would be disposed at angles of fifteen degrees relative to each other, etc.

It is obvious that any number of motors can be employed, and that each motor can consist of any number of rotors, dependent, of course, upon a sufficient source of water supply to furnish the cylinders of the rotors of the master, or first motor with the quantity of water necessary to instantaneously fill them to supply weight to the receiving ends of the cylinders to move them from their uppermost positions to their lowermost positions which is somewhere in the neighborhood of one-hundred and eighty degrees, or half of their cycle of operation, or travel in a downwardly direction. Water is carried downwardly by portions of the cylinders of the rotors on the shaft connecting the rotors of each motor, and hollow air tight pistons occupy the remaining portions of the cylinders of the rotors on the opposite side of the shaft so that the rotors on one side of the shaft are always lighter in weight than the rotors on the opposite side of the shaft due to the water carried in that portion of the rotor cylinders not occupied by the hollow air tight pistons, which are slidably mounted within the rotor cylinders.

Novel means is employed for locking the pistons in the cylinders at the moment the water is discharged from each rotor cylinder, so that they will be carried by the rotors from the end of the power travel of each rotor upwardly to a point above the rotor shaft where they are to be released to again be moved to the lower ends of the rotor cylinders with the discharge of water therefrom, so the cylinders can be again filled with water while at the upper end of the rotor travel, thus imparting through the several rotors of each motor, a continuous rotary motion to the rotors of the motor, or motors as the case may be.

Referring now to the drawings, in which I have shown one embodiment of my invention, I have indicated generally, at A in Fig. 1, a suitable reservoir having a plurality of compartments designated B, C, D and E. Compartment B is the master, or first compartment which is open at its upper end to constantly receive water from a suitable source of supply, as from a river F discharging water over a dam G. The depth of the reservoir is, of course, determined by the depth of the dam, and the width of the reservoir is determined by the width of the water flow over the dam. The water compartments of the reservoir designated in the drawings as C, D and E are closed on top and are made as air tight as possible. The latter compartments need not be as deep as the master compartment, as after they are once filled with water, they are continuously supplied, when needed, from the master compartment B through the cylinders of the rotors of the motors positioned therein and tubes connecting the several compartments, as hereinafter clearly described.

The reference character H designates the head of a stream of water leading away from the lower end of the last compartment E of the reservoir A and into which and below its level water discharged from the cylinders of the rotors of the motor in the last compartment of the reservoir is discharged to be carried away by the stream H.

The motors in the several compartments of the reservoir will now be described, and in as much as each motor is alike, like characters of reference will be used in describing the like parts of each motor, although for the purpose of identifying each motor from the other, as a whole, motor in compartment B will be known hereinafter as motor I; motor in compartment C, as motor J; motor in compartment D, as motor K and motor in compartment E, as motor L.

Each motor is shown, for purpose of illustration only, as consisting of four hollow air tight rotors designated 1, 2, 3 and 4. These rotors are inter-connected with a sectional shaft 5, which is suitably joined, as at 6, as shown in detail in Fig. 5, so as to make a unit of the rotors and the sectional shaft in order they may rotate together. The sectional shaft is journaled in suitable bearings 7 so positioned in each compartment of the reservoir that the rotors of each motor will be submerged in water a suitable distance below the level of water in each compartment. The level of water in each compartment should be, for safety, a distance above the rotors approximately half the diameters of the rotors. The diameters of the rotors are all alike and their diameter is determined by the height of the reservoir, which in turn, is determined by the height of the dam.

The shaft 5 of each motor above mentioned, is in axial alignment with the rotors of their respective motor, and one end of each shaft extends beyond one wall of the reservoir and is provided with a worm 8 which meshes with a worm gear 9 fixed to a main power shaft 10 which is connected with a device, such for instance as an electric generator 11. Thus, it will be observed that the power shaft of each motor is connected with the main power shaft, regardless of the number thereof.

Each cylindrical rotor of each motor employed, is provided with a cylinder 12 extending through the rotor. The ends of the cylinder are open and communicate with the peripheral face of the rotor. The open ends of the cylinder of each rotor are, preferably, not diametrically opposite each other relative to the axis of each rotor as the longitudinal axis of the cylinder does not pass through the axis of the rotor, but is positioned slightly to the power travel side of the rotor so that the cylinder will be slightly offset from the center of the rotor. There is an advantage in this arrangement, when it comes to the filling of each rotor cylinder with water at the up end of its travel, as will be more clearly apparent hereinafter, as the center of the cylinder when in a perpendicular position, will be eccentric to the axis of its rotor and off center of the rotor in favor of the power travel side of the rotor.

A suitable pneumatic, or hollow air tight piston, or float designated 13 is slidably mounted for reciprocating movement in the cylinder of each rotor of each motor employed. The rotor in each cylinder occupies, preferably, a little more than half the length of the cylinder in which it is disposed. The ends of the cylinder of each rotor is slightly contracted so as to provided a shoulder 14 at each end thereof to prevent the piston therein from being discharged from either end of the cylinder thereby limiting the reciprocating movement thereof. That portion, or space of the cylinder of each rotor not occupied by the piston is always filled with water. The space of each cylinder not occupied by the pneumatic piston is always to one side of the axis of each rotor, and, as shown, it is always filled with water to make it heavier than the piston bearing side which is light in weight due to the use of pneumatic pistons or floats. This automatic unbalanced relation, as respect to the rotors, and the fact that they are always submerged in a body of water of predetermined depth rotatably buoyant, continuous rotation of each motor shaft is made possible, as will be hereinafter apparent, where two or more rotors to form a motor are arranged side by side, with the longitudinal axis of their cylinders disposed at suitable angles relative to each other. This continuous rotary motion is brought about by the automatic shifting of the pneumatic piston from the top of the cylinder to the bottom thereof simultaneous with the discharge of water from the rotor cylinders, as will be more clearly understood hereinafter.

As shown in Fig. 1, a suitable tube 1' is positioned in each reservoir compartment adjacent rotor 1 of each motor. The upper end of each tube communicates at its discharge end with the air tight reservoir compartment to the right thereof, excepting the tube in the last compartment to the right. This last tube 1' in compartment E has its discharge end directed downwardly and submerged in the lower stream H. It will thus be seen that when the cylinders of the rotors 1 of each motor are all in a vertical position, as illustrated in Fig. 1, that the lower end of the cylinders of the rotors 1 of the first three motors communicate with the reservoir compartments to the right thereof through the tubes 1', and that the lower end of the cylinder of rotor 1 of motor in compartment E communicates with the lower stream H.

A suitable tube 2' is shown as positioned in each reservoir compartment adjacent rotor 2 of each motor and each tube 2' communicates at its discharge end with the air tight water compartment to the right thereof, excepting the last tube in compartment E. The tube 2' in compartment E has its discharge end directed downwardly and submerged in the stream H the same as the last tube 1'.

A suitable tube 3' is shown as positioned in each reservoir compartment adjacent rotors 3 of each motor and each tube 3' communicates at its discharge end with the air tight compartment to the right thereof, excepting the last tube in compartment E. The tube 3' in compartment E has its discharge end directed downwardly and submerged in the stream H, as do the last tubes 1' and 2'.

A suitable tube 4' is shown as positioned in each reservoir compartment adjacent rotor 4 of each motor and each tube 4' communicates at its discharge end with the air tight water compartment to the right thereof, excepting the last tube in compartment E. The tube 4' in compartment E has its discharge end directed downwardly and submerged in the stream H, as do the last tubes 1', 2' and 3'.

The intake end of each tube hereinbefore described is provided with a concaved shoe designated 15 to correspond to the contour of the rotors and the shoe has a length at least three times greater than the diameter of the cylinder of the rotor positioned directly above the shoe, and all but in facial contact therewith, to eliminate friction between the parts, and yet prevent any particular amount of water leakage therebetween during flow periods.

Each shoe 15 is provided with an inlet opening 16 registering with and communicating with the passage of its respective tube, so that the shoe will have two opposed wing sections designated 17 and 18.

A fixed shoe 19 is also disposed adjacent the upper side of each rotor and is of a length approximately twice the diameter of the cylinder of each rotor. Shoes 19 likewise do not frictionally engage the rotor, but are positioned close enough to avoid any particular amount of water within the reservoir compartments entering the upper ends of the cylinders before they start to pass the leaving ends 20 of the shoes. The upper shoes cover the upper ends of the cylinders from the time the lower ends thereof start to pass the openings 16 in the lower shoes 15 and until such time as the lower ends of the cylinders have fully registered with the openings of the lower shoes 15.

Mechanism for locking the piston in the cylinder of each rotor, when moved to the lower end of its respective cylinder, and for unlocking or releasing the piston for downward movement again just prior to it having reached its uppermost position due to rotation of the rotor, comprises, a pair of slidable like latches, designated 21 and 22, the inner ends of which are slidably mounted in laterally directed openings 23 and 24, respectively, in the wall of each rotor cylinder on diametrically opposite sides of the center of each rotor employed in making up a complete motor.

Each latch is tapered at its inner end, the taper being on the outer face of each latch, so that the straight side of the inner end of each latch can engage its respective end of the pneumatic piston with the cylinder of a rotor. As shown, the inner end of latch 21 extends into the cylinder a short distance and engages one end face of the pneumatic piston near the edge thereof when the piston is at one end of the cylinder, and latch 22, at this time is retracted to a position so that the inner end of the latch does not engage the piston. Each latch is shown as moved to its latching position by means of a suitable coiled spring 25, shown as encircling each latch between a shoulder 26 thereon and a suitable bearing 27 through which the outer end of each latch passes for guiding same in sliding movement.

A suitable track 28 is disposed adjacent the upper end of each rotor of each motor and its outer edge is provided with an inclined face 29 and a straight face 30. The track is shown as extending downwardly and outwardly from each upper shoe 19 and from one edge thereof. The cam track is of such length as to retract either latch at a predetermined position relative to the cycle of rotation of its respective rotor and to hold either latch in its retracted position until the rotor cylinder has moved to a substantially perpendicular position in its cycle of operation.

*Operation*

First of all, all of the motor compartments of the reservoir must be filled with water and thereafter the stream H moving over the dam G continuously supplies compartment B with water.

Figures 2, 6:
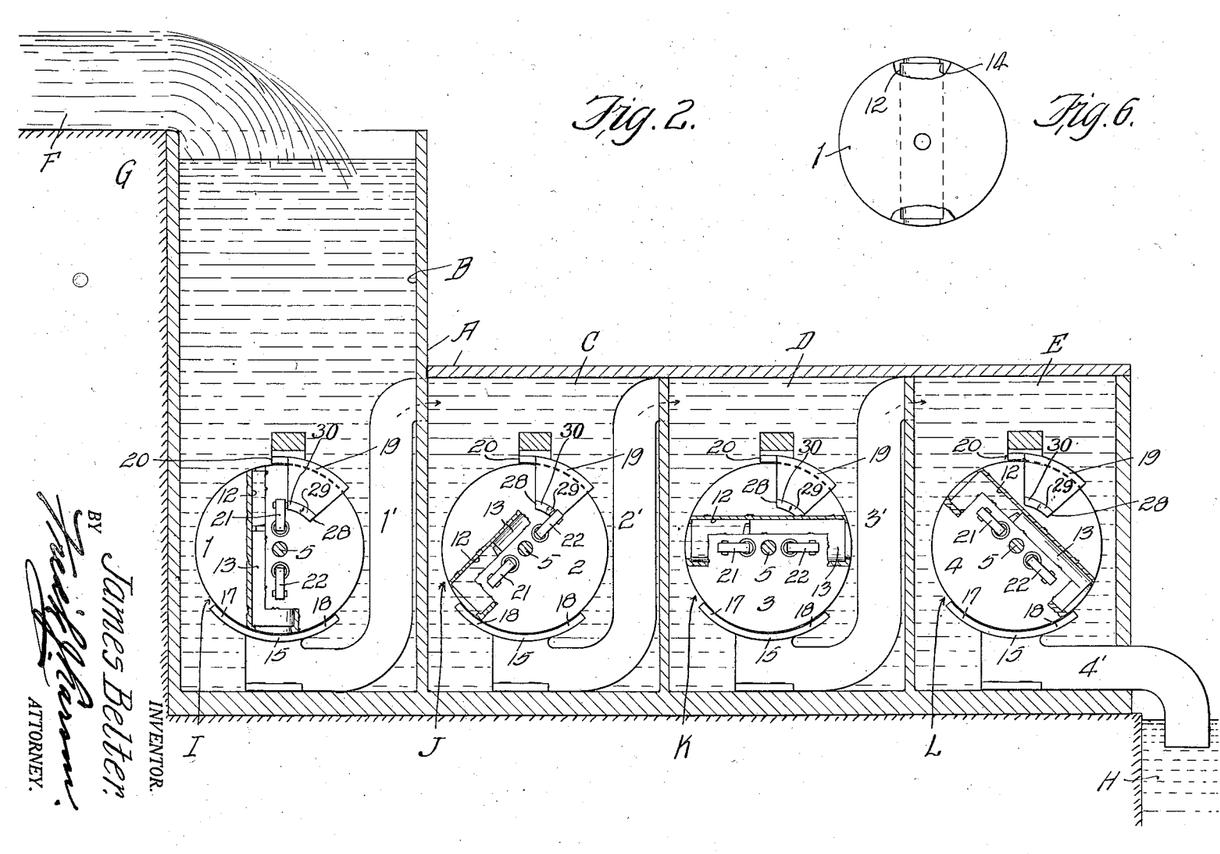
Fig. 2 is a vertically sectional view of the plant taken on the irregular line 2—2 of Fig. 1.
Fig. 6 is a side elevation of the rotor showing the cylinder thereof in a modified position.
Figure 3:
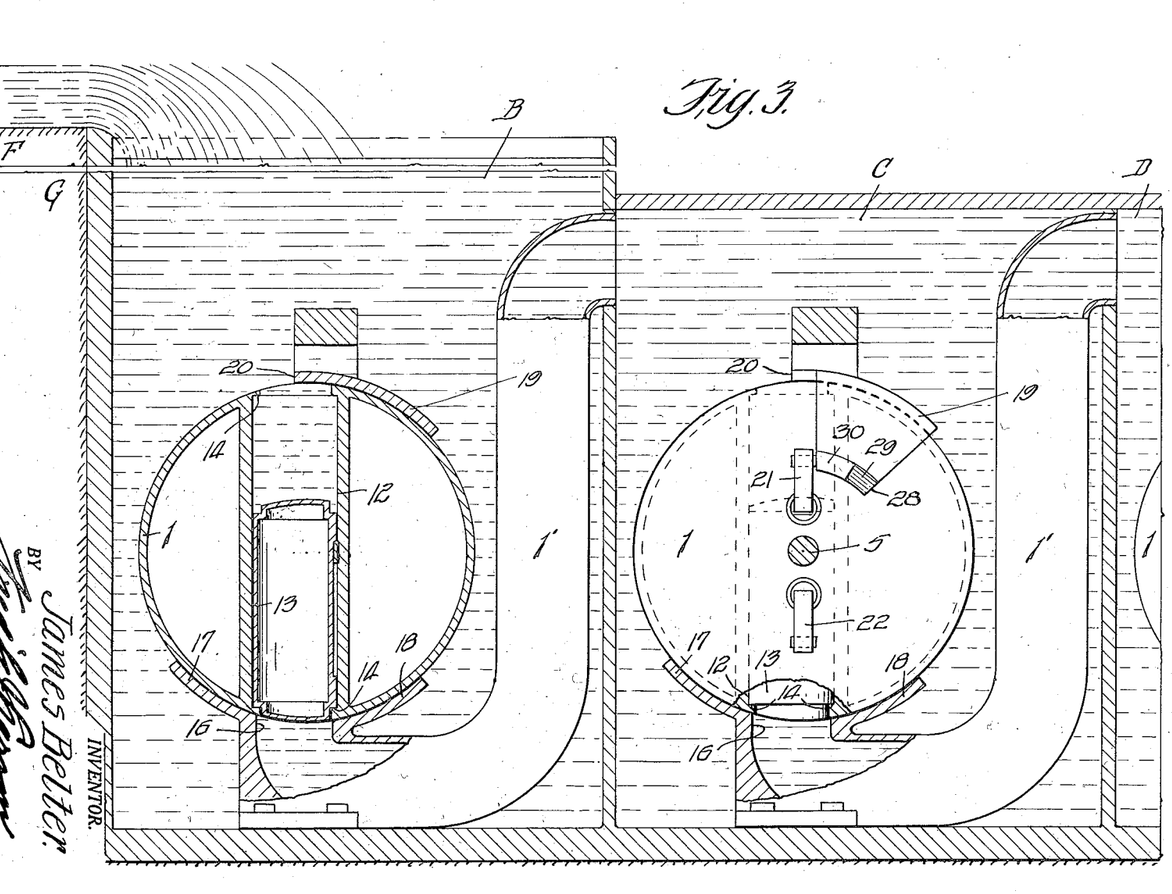
Fig. 3 is a vertical sectional view of two like rotors of two associated motors, clearly showing the cylinders and pneumatic pistons thereof and the means for conducting water from the cylinders of the rotors into adjoining water compartments of a reservoir.

That space of the rotor cylinders not occupied by the pneumatic pistons must, of necessity, be filled with water, thus each rotor of each engine is heavier on one side of its supporting shaft than on the other, or piston bearing side, which due to the fact that the cylinders of the several rotors of each motor are disposed in phase relation, as shown in Figs. 1 and 2, at an angle of forty five degrees relative to each other, a crank motion is set up for rotating the motor shafts.

Figure 4:
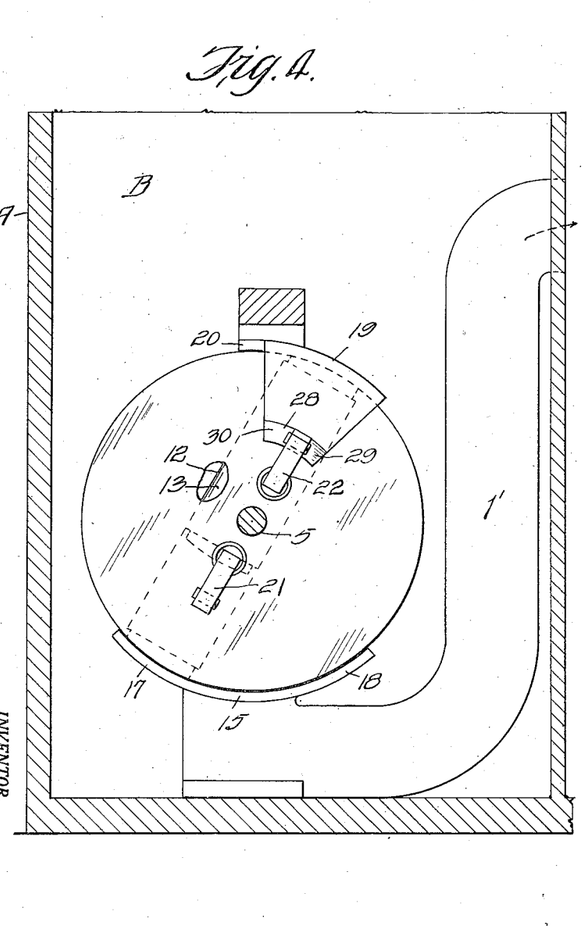
Fig. 4 is a detail of a rotor so positioned in its cycle of operation that the latch holding the piston therein from movement is just about to be retracted so as to allow the piston to move to the bottom of the cylinder with the flow of the water therefrom into a reservoir compartment next to the one in which the rotor is positioned.

As each cylinder discharges its water from the bottom thereof through a tube associated therewith into the next reservoir compartment, the pneumatic piston of such rotor which has been latched at the other end of the cylinder, is automatically released to follow the discharging water and when it reaches the lower end of the cylinder, it is automatically latched against movement until the cylinder of the rotor has reached the position shown in Fig. 4, when, then the latch holding the piston will be released to again allow the pneumatic piston to move to the lower end of the cylinder with the flow of the water from the lower end of the cylinder.

In the system illustrated, when water in the cylinder of rotor 1 of motor I is discharged through tube 1' into reservoir compartment C, the water in the cylinders of rotors 1 of motors J and K is simultaneously discharged through tubes 1' into reservoir compartments D and E and the water in the cylinder of the rotor 1 of motor L is simultaneously discharged into the stream H below the level thereof, so that no air can find its way back into the last tube associated with the rotor 1 in the reservoir compartment E. Simultaneously with the flow of water from the cylinders of all the rotors 1, the pistons therein follow the leaving water to the bottoms of the cylinders where they are instantly locked and moved upwardly with the rotors in completing their cycle of operation to be released at a predetermined time or period of the cycle of operation.

The cylinder of rotor 2 of each motor being on the way down are next to discharge their water, then next the cylinder of rotor 3 of each motor, then finally the cylinder of rotor 4 of each motor and then the same cycles of operation are repeated to impart a continuous rotary motion to the motor shafts 5 which is transmitted as described to a main power shaft 10.

As long as water is being continuously fed from a stream to the master reservoir compartment B, the motors will continue to operate, but should the water in compartment B fall to a predetermined low level above the rotors of motor I, the entire power will cease to rotate.

From the foregoing description, it is evident that the cylinder of each rotor is adapted to take in water and discharge the same from both ends thereof alternately. It will be understood that each rotor is hollow around the cylinder thereof, so as to render the same as light as possible relative to the volume of water to be carried by the cylinder thereof. Each rotor of each motor is hollow and air tight the same as the pistons or floats mounted in the cylinders thereof so that it will be rotatably buoyant when submerged in fluid.

While the cylinder of each rotor is shown as off center relative to the rotor, it is to be understood that the longitudinal axis of each cylinder can pass through the axis of the rotor, if so desired, in which case the open ends of the cylinders will be diametrically opposite each other.

From the foregoing description, it is to be clearly understood that the float or pneumatic piston in the cylinder of each rotor, of each motor, instantly replaces the water discharged therefrom at the lower end of the power travel of the rotor, thus permitting water to instantly enter the upper end of the cylinder to assist in continuing rotation of the motor shaft, due to the fact that each rotor of each motor on one side of the motor shaft is always heavier than the opposite side thereof, that is, the water side is always moving downwardly in an arcuate path and the float after being moved to the bottom of the cylinder is always moving upwardly in an arcuate path so the rotor will be off balance.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. In combination, a water falls, a reservoir constantly filled from said water falls and a hydro-pneumatic motor comprising two or more connected rotors each provided with a cylinder and pneumatic pistons mounted therein and said rotors submerged in the body of water within the reservoir and a power shaft connected with and arranged to rotate with the rotors.

2. In a power plant of the class described, a water falls, a reservoir adapted to be constantly filled with water from said water falls, a motor embodying a plurality of axially connected rotors, a cylinder for each rotor open at both ends, a pneumatic piston mounted in each cylinder, and means rendered effective by the ends of the cylinders of the rotors coming into periodical register therewith to discharge water carried by the cylinders causing the pistons in the cylinders to replace the water discharged therefrom.

3. The combination of a motor having a plurality of axially connected rotors, a reservoir filled with water in which the rotors are submerged for rotation, means for constantly filling said reservoir, said rotors each having a cylinder open at both ends, a pneumatic piston mounted in the cylinder of each rotor and normally disposed at one end thereof, the cylinders of said rotors being disposed at equal angles relative to each other and means associated with each rotor of the engine rendered effective by the ends of the cylinders of the rotors periodically moving into register therewith to discharge water carried by the cylinders thereby causing the pneumatic pistons in the cylinders to replace the water discharged therefrom.

4. The combination of a motor having a plurality of axially connected rotors, a reservoir filled with water in which the rotors are submerged for rotation, means for constantly filling said reservoir, said rotors each having a cylinder open at both ends, a pneumatic piston mounted in the cylinder of each rotor and normally disposed at one end thereof, the cylinders of said rotors being disposed at equal angles relative to each other, means associated with each rotor of the engine rendered effective by the ends of the cylinders of the rotors periodically moving into register therewith to discharge water carried by the cylinders thereby causing the pneumatic piston in the cylinders to replace the water discharge therefrom and a shoe carried by said means and disposed under each rotor to prevent water from the reservoir being discharged with the water in the cylinders.

5. The combination of a motor having a plurality of axially connected rotors, a reservoir filled with water in which the rotors are submerged for rotation, means for constantly filling said reservoir, said rotors each having a cylinder open at both ends, a pneumatic piston mounted in the cylinder of each rotor and normally disposed at one end thereof, the cylinders of said rotors being disposed at equal angles relative to each other, means associated with each rotor of the engine rendered effective by the ends of the cylinders of the rotors periodically moving into register therewith to discharge water carried by the cylinders thereby causing the pneumatic piston in the cylinders to replace the water discharged therefrom, a shoe carried by said means and disposed under each rotor to prevent water from the reservoir being discharged with the water in the cylinders and a shoe disposed above each rotor to prevent reservoir water entering the upper ends of the cylinders until water at the lower ends thereof has practically been discharged therefrom and the pistons having reversed their positions relative to the ends of the cylinders.

6. The combination of a motor having a plurality of axially connected rotors, a reservoir filled with water in which the rotors are submerged for rotation, means for constantly filling said reservoir, said rotors each having a cylinder open at both ends, a pneumatic piston mounted in the cylinder of each rotor and normally disposed at one end thereof, the cylinders of said rotors being disposed at equal angles relative to each other, means associated with each rotor of the engine rendered effective by the ends of the cylinders of the rotors periodically moving into register therewith to discharge water carried by the cylinders thereby causing the pneumatic piston in the cylinders to replace the water discharged therefrom, a shoe carried by said means and disposed under each rotor to prevent water from the reservoir being discharged with the water in the cylinders, a shoe disposed above each rotor to prevent reservoir water entering the upper ends of the cylinders until water at the lower ends thereof has practically been discharged therefrom and the pistons having reversed their positions relative to the ends of the cylinders, means locking the pistons at the ends of the cylinders from which the water has been discharged and means for unlocking the pistons in their cylinders simultaneously with the discharging of water from the cylinders of the rotors.

7. A power plant having a water falls, a reservoir being constantly filled from the water falls, a motor embodying a plurality of axially connected rotors having cylinders open at both ends and submerged in the reservoir water, reciprocable pneumatic means controlling the space within the cylinders so as to render the rotors heavier on one side of their axis than on the other and means rendered effective by the water carrying ends of the cylinders coming into register therewith to discharge the water thereof and causing the pistons in the cylinders to replace the water discharged therefrom to maintain the unbalanced relation of the rotors.

8. A power plant having a water falls, a reservoir having a plurality of separate water compartments, one of said compartments adapted to be constantly filled with water from said falls, a motor for each water compartment, each motor embodying a plurality of rotors interconnected to a motor shaft, a cylinder open at both ends and a pneumatic piston for each cylinder, said rotors being submerged in the water of their respective water compartments to a predetermined depth, and means associated with the rotor of all but one motor rendered effective for conducting water from the rotor cylinders at predetermined intervals to an adjoining reservoir water compartment and causing the pistons in the cylinders to replace the water conducted therefrom and means associated with the last motor of the series to conduct water from the cylinders of the rotors to and below the level of the rotors and said means having their discharge ends submerged in said stream.

9. In a hydro-pneumatic turbine, a reservoir, a source of constant water supply for the reservoir, a turbine shaft, a plurality of hollow air tight rotors fixed to said shaft, a cylinder for each rotor having open ends to receive water from the reservoir in which the rotors are submerged, a hollow air tight piston mounted in the cylinder of each rotor, means for locking the piston at one end of the cylinder after the discharge of water therefrom, to which end the piston has been moved with the discharge of water therefrom, and means for timing the release of said piston just prior to the opposite end of the cylinder passing center in a power travel direction of rotation so as to be free to be moved to the opposite end of the cylinder with the discharge of water therefrom so as to replace the water discharged therefrom and to provide space at the opposite end of the cylinder to take in a fresh charge of water.

10. In a hydro-pneumatic turbine, a reservoir, a source of constant water supply for the reservoir, a turbine shaft, a plurality of hollow air tight rotors fixed to said shaft, a cylinder for each rotor having open ends to receive water from the reservoir in which the rotors are submerged, pneumatic means mounted for sliding movement in the cylinder of each rotor, means for locking said means at a predetermined position of the rotor of each motor in its cycle of operation and means for unlocking the said piston of each cylinder at a predetermined position of the rotor in its cycle of operation.

11. In a hydro-pneumatic turbine of the class described comprising a shaft, means for rotatably supporting said shaft, a plurality of hollow pneumatic rotors, a cylinder for each rotor, a pneumatic piston in each cylinder, mechanism locking the piston in each cylinder at a predetermined interval of each cycle of the rotor and means for releasing the piston at a predetermined interval of each cycle of the rotor, said rotor adapted to be submerged in a body of water fed from a suitable source of supply and means for discharging water from each end of the cylinder of each rotor.

12. A power installation comprising a body of water constantly maintained at or above a predetermined level, a plurality of hollow air tight rotors submerged and rotatably mounted in said body of water, said rotors each having cylinders open at both ends disposed diametrically of the rotors and in phase relation to each other, discharge conduits leading from the lower sides of the rotors with which the ends of the cylinders have periodic communication, and floats mounted in said cylinders, said floats adapted to be disposed at one end of said cylinders during one-half revolution of their respective rotors and moved to the opposite end of the cylinders with the flow of fluid from the cylinders when they communicate with the conduits and followed up during movement in the cylinders with fluid from the body of water.

13. A power generating system characterized by a fluid supply head, the level of which is maintained by a source of supply, a plurality of spaced hollow air tight rotors, said rotors being submerged in the fluid supply head, a cylinder open at both ends disposed diametrically of each rotor and in phase relation to each other, a float mounted in each cylinder and of a length approximately one-half the length of each cylinder, said floats being buoyantly supported at one end of their respective cylinders during a period of rotation of the rotors and moved during fluid flow periods toward the opposed ends of the cylinders and progressively followed up with fluid from the fluid supply head.

14. A power generating system characterized by a body of water having outlets, enveloping in spaced relation a plurality of hollow air tight shaft connected rotors, said body of water being maintained by a source of supply, said rotors each having a cylinder open at both ends and in phase relation to each other, a float approximately half the length of the cylinders mounted in each cylinder, said floats being buoyantly supported at the upper ends of their cylinders and followed up with water during discharge from the lower ends of said cylinders when they register with the outlets, such discharge taking place twice during one revolution of each rotor.

15. A power generating system of a class in which fluid is fed from a constant source of supply to one compartment of a plurality compartment reservoir to maintain therein a predetermined quantity of fluid to be discharged periodically from open ended cylinders and from adjoining open ended cylinders to maintain a predetermined quantity of fluid in the compartments to fill the upper ends of the open ended cylinders carried by rotors mounted in said compartments, and floats in said cylinders movable downwardly with the discharge of fluid from the lower ends of the cylinders.

16. A motor characterized by means for periodically discharging fluid therefrom, said means including a plurality of shaft supported hollow air tight rotors submerged in a fluid maintained at a level above the rotors, a cylinder disposed diametrically of each rotor in phase relation to each other and open at both ends, a float in each cylinder and a discharge conduit leading from the lower side of each rotor with which the ends of respective cylinders periodically communicate and during such communication permitting the flow of fluid therefrom to progressively displace each float in its downward movement during flow periods with fluid in which the rotors are submerged thereby setting up rotation of the rotors and their supporting shaft.

17. A motor characterized by means for periodically discharging fluid from open ended cylinders arranged in phase relation to each other and submerged in a constantly maintained body of fluid serving as a water head, said means also including a float disposed at one end of each cylinder during non-discharge periods and drawn to the opposite end of each cylinder during discharge periods.

18. A motor characterized by rotatable cylinders formed in hollow air tight shaft supported rotors submerged in a constantly maintained body of fluid, floats disposed at one end of the cylinders during non flow periods and drawn to the opposite end of the cylinders during flow periods, and during said flow periods permitting fluid from said constantly maintained body of fluid to displace the floats.

19. A motor characterized by a plurality of shaft supported rotors submerged in a plurality of water heads and the rotors in each head provided with a plurality of open ended cylinders in phase relation to each other and a float for each cylinder, one of said water heads being constantly supplied with water from a source of supply and the other water heads from the preceding one by conduits, said cylinders having a period of fluid discharge and simultaneous intake.

20. A motor characterized by a master fluid reservoir within which there is maintained a predetermined quantity of fluid delivered from a source of supply, a plurality of conduit connected fluid contained reservoirs associated with the master reservoir each of which serves as a supply head, a plurality of hollow air tight rotors submerged in the fluid in each of said reservoirs, a cylinder open at both ends for each rotor and the cylinders in each reservoir disposed in phase relation to each other, a float mounted in each cylinder of a length approximately half the length of its respective cylinder, the floats in the cylinders in series upon reaching a perpendicular position adapted to be simultaneously followed up by fluid entering the cylinders at the upper ends thereof during flow of fluid from the lower ends of the cylinders in one reservoir to the next reservoir, such entrance of fluid into the cylinders during flow periods serving to make the rotors top heavy.

21. A motor comprising a tank of fluid maintained at a predetermined level constantly delivered from a source of fluid supply, a plurality of hollow air tight rotors submerged in the fluid in said tank and having open ended cylinders diametrically thereof in phase relation to each other, a float mounted to occupy a portion of each cylinder, a discharge conduit for each cylinder, said floats being buoyantly supported at the upper ends of the cylinders when in perpendicular positions and movable toward the opposite ends of the cylinders during flow periods.

22. A motor comprising a plurality of spaced fluid reservoirs, the first of which reservoirs is open to atmospheric pressure and maintained with fluid at a predetermined level from a constant source of supply, the remainder of said fluid reservoirs being air tight, each reservoir being conduit connected with the preceding reservoir and the last of said reservoirs having discharge conduits with the discharge ends thereof submerged in a stream of fluid below the reservoirs and a plurality of hollow air tight rotors in each reservoir having cylinders in phase relation to each other and provided with floats submerged in the fluid in the reservoirs, fluid flow out of the cylinders taking place twice during each revolution thereof and during flow periods the floats in the cylinders being followed up during downward movement thereof with fluid from their respective reservoirs.

23. A water power system wherein a constant supply of water is maintained in conduit connected water compartments from which predetermined quantities are to be periodically discharged therefrom, characterized by submerged cylindered rotors having floats in the cylinders which are open at both ends, said floats being followed up with water twice during a complete rotation of each cylinder during flow periods so as to lighten the rotors on up moving side thereof and to add water weight to the down moving side thereof.

24. A water power system wherein a constant supply of water is maintained in separate conduit connected water compartments and from which predetermined quantities are periodically discharged therefrom, characterized by a plurality of rotors of hollow air tight construction submerged in said conduit connected compartments, cylinders for the rotors open at both ends, floats in the cylinders, the floats in certain cylinders being simultaneously displaced periodically with water from their respective compartments during downward movement of the floats with the discharge of water from the cylinders to the next compartment to add water weight to one side of the rotors.

25. In an apparatus of the class described, in combination, a source of running water, a plurality of reservoirs, one of which is open and constantly filled with water at a desired level and the remainder of said reservoirs being filled with water from the first and each other, a plurality of buoyancy motors, one in each reservoir, conduit connections between the motor in one reservoir and the next reservoir, the motor in each reservoir including a plurality of rotors having cylinders open at both ends and arranged in phase relation to each other, a float in each cylinder, one float in each reservoir moving downwardly in unison when either end of their respective cylinders register with their respective conduits and displaced with water from their respective reservoirs, and discharge conduits submerged in a lower stream of water at their discharge ends leading from one of the reservoirs permitting an undulated flow of water from the first reservoir to the last twice during each revolution of each cylinder of each motor.

26. The combination of a rotary buoyancy motor having a water head maintained at a constant level, a plurality of drum like rotors buoyantly submerged in the water head, cylinders for the rotors arranged in phase relation to each other, a float for each cylinder movable with the discharge of water from its respective cylinder and followed up by water from the water head to add weight to one side of the rotors.

27. The combination of a rotary buoyancy motor having a water head maintained at a constant level from a source of supply, a plurality of drum like rotors buoyantly submerged in the water head, cylinders for the rotors open at both ends and arranged in phase relation to each other, a float for each cylinder movable with the discharge of water from its respective cylinder and followed up with water from the water head, said water discharge taking place twice during each revolution of each rotor.

28. The combination of a rotary buoyancy motor having a master body of water maintained at a constant level from a source of supply, a plurality of bodies of water associated with the master body, conduits connecting said bodies of water, a plurality of drum like rotors buoyantly submerged in each body of water, cylinders for the rotors in each body of water arranged in phase relation to each other, a float in each cylinder, certain of the floats being moved downwardly in unison twice during each revolution of the cylinders and followed up by water from the water bodies.

29. The combination of a rotary buoyancy motor having a plurality of submerged rotors, cylinders for the rotors open at both ends and in phase relation to each other, a float for each cylinder periodically effective by the discharge of fluid from the lower ends of the cylinders permitting refill of the cylinders from the opposite end to provide weight for the downwardly moving sides of the rotors.

30. The combination of a rotary buoyancy motor having a submerged rotor, a cylinder for the rotor open at both ends, a float for the cylinder periodically effective by the discharge of fluid from the lower end of the cylinder permitting refill of the cylinder from the opposite end to provide weight for one side of the rotor twice during each revolution of the rotor.

31. A rotor of the class described having a cylinder diametrically thereof and with the ends open to the rim thereof, a hollow air tight float in the cylinder approximately half the length thereof and stops to limit movement of the floats within the cylinder.

32. A power installation provided with a plurality of rotors submerged in a body of fluid, cylinders for the rotors arranged in phase relation to each other and open at their ends to the rims of the rotors and floats in the cylinders adapted to be shifted twice during each revolution of the cylinders with the discharge of fluid therefrom.

33. The combination, in a power installation, of a tank, fluid in the tank, a source of constant fluid supply for the tank, a plurality of shaft connected cylinders diametrically thereof in phase relation to each other and open at their ends to the rims of rotors, an outlet for each cylinder and a float in each cylinder which when each cylinder is in perpendicular position registers at its lower end with its respective outlet discharging fluid from the lower half thereof carrying the float therewith to permit filling of the other half of the cylinder with fluid from the tank to serve as weight on one side of the axis of the rotors.

34. The combination, in a power installation, of a tank, fluid in the tank, a source of constant fluid supply for the tank, a plurality of horizontally axially aligned rotors submerged in the fluid, cylinders in phase relation to each other for the rotors and open at their ends to the rims of the rotors, an outlet for each cylinder, and a float in each cylinder which when each cylinder is in phase sequence registers at either end thereof with its respective outlet discharging fluid from the lower half thereof followed by the float therein to permit the filling of the upper half of the cylinder with fluid from the tank to serve as weight to one side of the axis of the rotors.

35. In a power installation, the combination of a plurality of hollow rotors having phase related cylinders open at their ends to the rims of the rotors and each carrying a float approximately half the length thereof, each of which floats is movable in its respective cylinder independently of the other, means to limit movement of the floats, said floats being at one end of their respective cylinder during one half revolution thereof and to one side of the axis of the rotor and said floats being at the other end of their respective cylinders during the other half revolution thereof, a tank, fluid in the tank serving as a water head and in which the rotors are submerged, a source of constant fluid supply for the tank, and an outlet for each cylinder which when the cylinders register therewith in their phase sequence effects the shifting of the floats from an upper position in their cylinders to a lower position therein due to fluid discharge, the floats during their change of position being replaced with fluid from the tank, such actions causing the weight of fluid in the cylinders on one side of the axis of the rotors to off balance the float carrying ends of the cylinders on the other side of the axis of the rotors.

36. In a power installation, a plurality of communicating bodies of fluid, a source of constant supply for the first of said bodies of fluid in the series, outlets for the last of said bodies of fluid in the series, a plurality of shaft connected rotors submerged in each body of fluid in the series, a plurality of cylinders arranged in phase relation to each other and disposed diametrically of the rotor in each body of fluid and open to the ends of the rims thereof, floats mounted in the cylinders of the rotors, the floats in the cylinders of the series arranged rotors of like phase relation moving simultaneously in a downward direction and commencing with the discharge of fluid from the cylinders to the body of fluid next in the series and from the cylinder in the last body of fluid in the series to a stream in which the discharge end of the outlet is submerged at an elevation below the said bodies of fluid, said cylinders simultaneously taking in and discharging fluid in their phase sequence to effect shifting of the floats two times during each revolution of the rotors.

37. A motor comprising a channel through which water will flow twice during each revolution of a plurality of rotors in series, the rotors being submerged in separate water heads and after each flow said rotors being revolved in unison by the weight of water carried by each rotor, the water being discharged from one rotor to the next water head, the first water head being supplied from a source of supply and the last rotor discharging to a lower elevation than the bottom of the water heads.

38. A motor comprising channels through which water may flow periodically to shift the positions of floats in the channels to stop the flow and unbalance rotors, in series, by water in which the rotors are submerged so that by the weight of water in the rotors, rotary motion will be imparted to the rotors.

39. In a power producing device of the class described, characterized by a plurality of conduit connected bodies of water, the first of said bodies of water serving as a water head which is fed from a source of supply, the last of said bodies of water having a discharge conduit directed downwardly therefrom to a lower elevation than the bodies of water, a plurality of shaft connected rotors in each body of water and like rotors in the several bodies of water being in series, the rotors having cylinders open at each end and floats in the cylinders.

40. A motor comprising a water reservoir having a plurality of outlets, a plurality of shaft connected rotors submerged in the water of the reservoir, said rotors having open ended cylinders adapted to register with the outlets twice during each revolution of the rotors, the cylinders being arranged in phase relation to each other and floats in the cylinders adapted to be moved downwardly to the lower ends of the cylinders with a discharge therefrom each time the cylinders register with the outlets so that the upper ends of the cylinders can be filled with water to be next discharged.

41. In a device of the class described, a plurality of bodies of water, a source of supply for the first body, a prime mover submerged in each body of water, and means permitting periodical movement of a quantity of water out of each prime mover and into the next body of water, and the water from the last prime mover being discharged therefrom at an elevation below the elevations of the bodies of water.

42. A power installation unit comprising a constantly maintained water head, a plurality of shaft connected rotors submerged in said water head, said rotors each having a cylinder open at both ends, said cylinders being arranged in phase relation to each other, a float for each cylinder and water outlets with which the ends of the cylinders periodically register.

43. A power installation unit comprising a constantly maintained water head, a plurality of rotors each of which is provided with an open ended cylinder in phase relation to each other and submerged in the water head, a float for each cylinder and a water outlet associated with each cylinder.

44. A motor comprising a plurality of bodies of water, one of which is fed from a source of supply and the others from each other, a plurality of channels through which water can flow from one body of water to the next in phase relation, means shiftable with the flow of water in each channel to stop the flow and shaft connected means in each body of water rotated part of a cycle by water weight carried by the shaft connected means, the discharge end of each channel being disposed at an elevation below said bodies of water and a shaft common to the shaft connected means in each body of water so that the power developed by the rotation of each shaft connected means can be delivered to the shaft common thereto.

45. A motor comprising a plurality of bodies of water, one of which is fed from a source of supply and the others from each other and the last discharging it at an elevation below said bodies of water, a plurality of channels through which water can flow from one body of water to the next, in unison, the flow in the channels in each body of water being timed in like phase relation, means in each body of water shiftable with the flow of water therefrom and adapted to stop the flow, and means in each body of water operable by the weight of water in said means.

46. A power generating system characterized by a plurality of bodies of water, a source of supply for the master body of water, a sectional rotatable device common to each body of water, a plurality of channels periodically formed through and leading from each section of the rotatable device in one body of water to the next body of water, a plurality of shiftable members in the channel in each body of water for stopping the flow therethrough and means for directing the flow from the discharge ends of the channels to an elevation below the bodies of water.

47. A power generating system characterized by a plurality of bodies of water, a source of supply for the master body of water, a plurality of shaft connected rotors submerged in each body of water, said rotors having open ended cylinders and arranged in each body of water in phase relation to each other, conduits connecting the rotors in each body of water with the body of water next thereto, the rotor cylinders and the conduits forming channels leading from one body of water to the next body of water when the rotor cylinders register with said conduits to permit water to leave the lower ends of the cylinders and enter the upper ends of the cylinders, and floats in the rotor cylinders shiftable from the upper ends thereof to the lower ends thereof during flow of water through the channels to stop said flow and lighten the lower half of the cylinders in weight so that the weight of the water in the upper ends of such cylinders will cause the rotors to revolve half of a cycle to bring the floats to such positions as to again be moved to a lower position within the cylinders during the flow of water through the channels.

48. A motor characterized by a plurality of bodies of water, one adapted to be fed from the other, and one fed from a source of supply, shaft connected means in each body of water, means for periodically forming a plurality of channels through which water will flow from one body of water to the next, means timed in phase relation in each body of water and shiftable with each flow of water and to stop the flow, and the flow of water from each body of water being discharged at an elevation below all the bodies of water, said shaft connected means being acted upon after the flow of water and before the next flow of water to revolve the shaft connected means aided by water therein, and said shaft connected means being common to a driving shaft connected therewith.

JAMES BELTER.